United States Patent [19]
Carstensen

[11] Patent Number: 4,878,285
[45] Date of Patent: Nov. 7, 1989

[54] METHOD OF ASSEMBLING COUPLING TO TUBING OR CASTING

[76] Inventor: Kenneth J. Carstensen, 4540 N. 44th St., No. 70, Phoenix, Ariz. 85018

[21] Appl. No.: 117,682

[22] Filed: Nov. 5, 1987

Related U.S. Application Data

[60] Division of Ser. No. 802,943, Nov. 27, 1985, Pat. No. 4,706,997, which is a continuation of Ser. No. 379,615, May 19, 1982, abandoned.

[51] Int. Cl.$^4$ .............................................. B23P 11/02
[52] U.S. Cl. ........................................ 29/451; 29/464; 29/525.1
[58] Field of Search ................... 285/332.3, 333, 355, 285/383, 395; 29/526 R, 451, 407, 464, 525.1

[56] References Cited

U.S. PATENT DOCUMENTS

| | | | |
|---|---|---|---|
| 1,590,357 | 6/1926 | Feisthamel | 285/333 X |
| 1,889,868 | 12/1932 | Montgomery | 285/383 X |
| 1,889,869 | 12/1932 | Montgomery | 285/383 X |
| 2,086,667 | 7/1937 | Fletcher | 29/407 |
| 2,150,221 | 3/1939 | Hinderliter | 285/332.3 |
| 2,320,107 | 5/1943 | Speckert | 285/332.2 X |
| 2,380,690 | 7/1945 | Graham | 285/332.2 X |
| 3,266,821 | 8/1966 | Safford | 285/332.2 X |
| 3,339,945 | 9/1967 | McCrody, Jr. et al. | 285/355 X |
| 3,850,461 | 11/1974 | Fujioka et al. | 285/332.2 |
| 4,127,927 | 12/1978 | Hauk et al. | 29/407 |

*Primary Examiner*—Charlie T. Moon
*Attorney, Agent, or Firm*—Merchant & Gould

[57] ABSTRACT

Precision makeup at high speed of the most used forms of pipe and casing for production wells is assured by a novel coupling system. A pipe collar is provided with an internal precision makeup ring whose length along the pipe axis assures precise positioning and engagement. When the nose of the pipe is engaged with metal-to-metal contact against a reference shoulder on the precision ring a side surface on the nose end of the pipe engages a center seal ring disposed in the side wall of the collar between the reference shoulder and the threaded portion. This seal constitutes an effective barrier against the leakage of high internal pressures into the thread engagement region. End seals are mounted in grooves in the end recess portions of the collar, outside the threaded engagement region, to provide seals against external pressure, which can also vent internal pressures that are in excess of a predetermined threshold. With this arrangement, a modified standard collar or a manufactured collar can be placed on a pipe or casing off the drill rig floor, with the axial length of the precision ring being selected to assure makeup tightness adjusted to particular axial stress conditions. Makeup on the rig floor requires only stabbing of the next pipe section into the collar and engagement until metal-to-metal contact is achieved and seals are concurrently established. Pipes and collars can readily be pre-screened to eliminate a minor proportion of elements whose thread tapers vary more than is permissible for the given conditions.

1 Claim, 12 Drawing Sheets

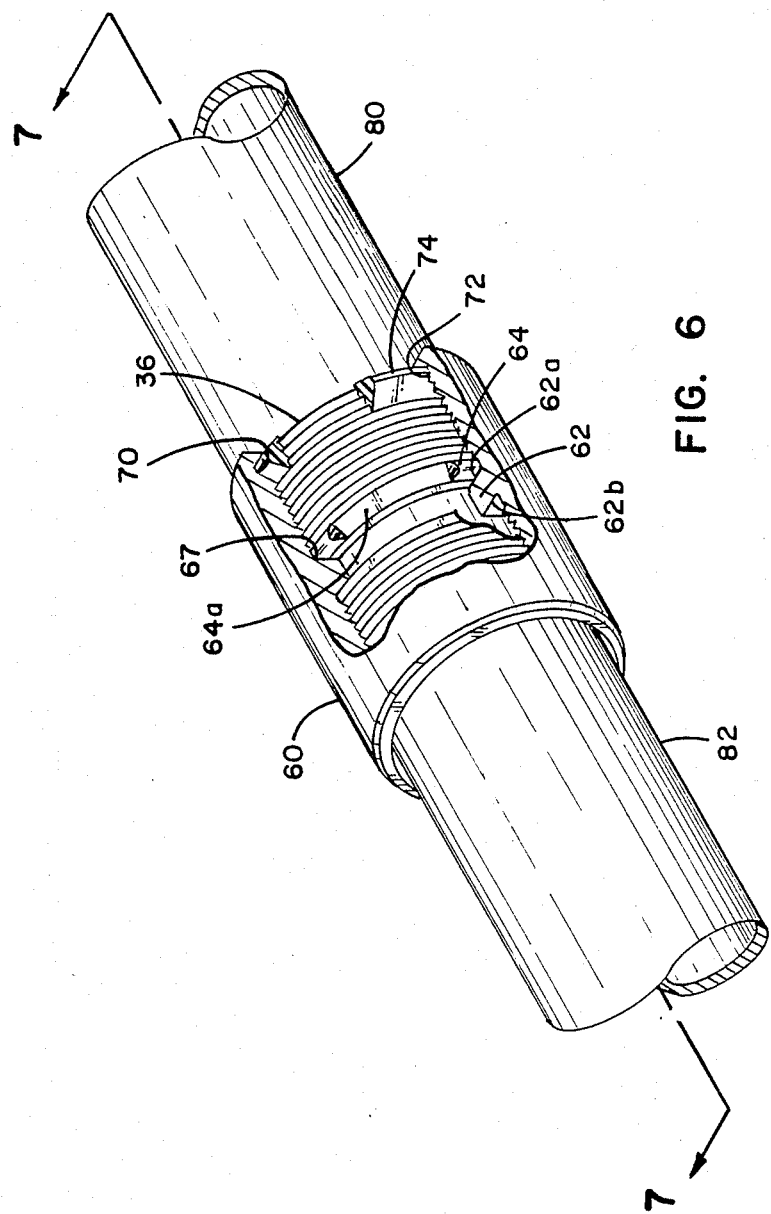

METHOD OF ASSEMBLING COUPLING TO TUBING OR CASTINGFig

This is a divisional of co-pending application Ser. No. 802,943 filed on Nov. 27, 1985, now Pat. No. 4,705,997, which is a continuation of application Ser. No. 379,615, filed May 19, 1982, abandoned.

BACKGROUND OF THE INVENTION

Oil well pipe and casing are examples of tubular products used in production wells that are subjected to particularly stringent operating conditions. They must, for example, withstand extremely high mechanical loads when connected together in a long string, and at the same time be substantially unaffected by both internal and external pressures and corrosive environments. The extremely high pressures encountered, for example, can cause differential deformation of the threaded pin end of a pipe relative to the receiving collar if the pressurized gases or liquids penetrate between the threaded regions, sometimes causing decoupling of the string. One obvious response by those in the art to these conditions has been to employ special coupling arrangements, based on high strength sections and square or rectangular threads, such as shown in Pat. Nos. 4,009,893, 4,154,466, 4,209,193 and 4,253,687.

The practical state of the art is shown in a book widely used in the oil industry entitled "Tubular Connection Data", published by Weatherford/Lamb, a Weatherford International Company, 2nd edition, copyright 1978. This book depicts the great majority of couplings that are currently in field use today, including standardized American Petroleum Institute (A.P.I.) "8 round" and "buttress" tubing, and a number of specialized couplings using internal seals in the threaded region, corrosion barriers and the like.

While the special box (collar) and pin (pipe or casing) couplings are of theoretical benefit, they are of far less practical utility because they are nonstandard and expensive. There is today a vast inventory of A.P.I. pipe of 8 round and buttress type in different grades and weights which must be kept in use for obvious economic reasons. Equally obviously, the procedures used at the pipe rack and on the rig floor should involve a minimum number of conventional steps, and be quick, convenient and inexpensive to implement. It is particularly desirable to expand the range of field conditions under which A.P.I. pipe can be used while reducing the number of circumstances under which special equipment or instrumentation is needed. For more critical situations, equipment can be employed which counts turns, monitors torque or measures bearing pressures during makeup. Measurement of torque is not an accurate guide to engagement, because friction factors thread profile and pitch, thread smoothness and lubricity all have an effect on the reading. When makeup is complete, instrumentation systems can be used to test the integrity of the seal with gas or liquid. Using both categories of equipment together is extremely costly but even where used does not permit expansion of the role of A.P.I. tubing. In a joint that is very tightly made, the entering end of the pin is highly stressed, approaching the yield point at this thinnest portion of the tapered thread. A slight inattention on the part of an operator results in overstressing or galling of the pipe. Even with proper makeup galling or permanent deformation occurs in the forward threads on the pin after a few engagement operations. Consequently there is an inherent limit to the usage of increased bearing pressure to assure a pressure seal. Even more, reliance on a tight thread engagement for sealing is essentially unreliable because of tolerances that must be accepted, thread damage and other non-uniformities. Recognition of these factors has led to the widespread usage of field instrumentation mentioned above.

The practical operating and cost requirements focus attention on crucial specific problems involved in making up secure leak-free joints under field conditions. A.P.I. pipe has a specified length and taper angle of thread on the box and pin, and includes defined acceptable tolerances for the tapers. The collar or box has inner diameter threads which taper inwardly from each end to a threaded mid-region or crest of smallest inner diameter, such that the pin can be threaded in to a penetration depth which is limited only by the forces which can be exerted during makeup. With A.P.I. pipe, assuring proper coupling of the pin to the box on the rig floor presents significant problems. The "last scratch mark" of the threaded region defines a reference against which the nominal depth of insertion can be gauged, but it is not practical to monitor last scratch position in the fast paced and environmentally imperfect conditions under which extremely long strings of production tubing and casing must be assembled. Moreover, many imperfections and defects relate to sealing problems and prevent use of pipe for this reason only even though mechanical engagement may be adequate. Under present practice such pipe can be used in only very limited ways or must be scrapped.

Details as to standard A.P.I. pipe can be found in A.P.I. Standard 5B (10th edition), March 1979 and Supplement 1 thereto issued March 1980, these documents being issued by the American Petroleum Institute, Production Department, 211 North Ervay, Suite 1700, Dallas, Tex. 75201. The standards define such factors as the angles of taper, pitch, profile, and effective thread length, as well as the plane of hand tight engagement and the plane of "vanish point" which defines a theoretical position for a power-tight makeup. The term "taper" is usually regarded as involving both the angle and the dimension of the pipe thread, which together determine the depth of penetration of the pin end into an ideal collar. In these standards, it should be noted that with round thread or buttress thread a space is necessary between mating thread profiles. In the round thread, for example, this is referred to as a "root helix", and this small clearance provides a continuous path through which leakage or buildup of a high pressure fluid can occur.

If the pin taper is at the opposite end of the tolerance limit from the box thread taper, or if the dimensional variations are at opposite tolerance limits, then adequate thread engagement may occur either well before or well after the nominal position defined by reference to the last scratch mark. The assumption that adequately firm thread engagement will provide the needed internal and external seal is not a satisfactory basis for makeup because of the problems of thread damage and pressure buildup within the root helix at the extremely high pressures that are encountered.

It should be noted, as evidenced by Pat. Nos. 2,980,451, 3,047,316, 3,054,628, 3,831,259 and 3,923,324, as well as some of the earlier referenced patents, that it has been common for a long time to utilize seal elements positioned within the threaded region of a pin and box junction.

Such seals are generally referred to in the industry as Atlas-Bradford seals, and their benefits must be weighed against their disadvantages. They are incorporated in a portion of the threaded structure, which means in turn that they reduce both the length of thread engagement and the wall diameter. Furthermore, they introduce internal stress risers in a critical portion of the thread engagement zone. In addition, the threads of an entering pin deform or tap through the seal, and it is found in practice that an imperfection or irregularity can cause the seal to become caught and either disengaged or destroyed during make-up. Such seals are also disposed against the external end of the threaded region and equally provide a barrier to the release of internal pressure. This in turn means that an internal pressure can penetrate between the opposed pin and box threads throughout most of their lengths, and can cause the differential deformation that might lead to decoupling of the string.

Other coupling designs are based on the usage of metal-to-metal seals at one or both ends of the threaded region. Since metal-to-metal seals require an almost perfect mirror finish, contact between metal surfaces does not always provide a reliable seal, particularly under field conditions, because of galling, scratches, or other damage that might occur to one or the other of the surfaces. Furthermore, when surfaces must be precisely placed with the degree of accuracy required for these seals, the product cost is increased by multiple, rather than fractional, amounts, under actual operating conditions, penetration of a corrosive high pressure fluid into the threaded engagement region over a substantial period of time may not only have catastrophic effects, but may create time consuming problems because of corrosion of the threads, drying out of the pipe joint compound or lubricant, and weakening of the coupling. External pressures can also act adversely on the coupling system. Leakage in a casing may, for example, surround an encompassed tubing with a high pressure, flow environment that is of substantially higher pressure than the interior of the tubing. Such pressures can build up within the threaded portion of the coupling and have the previously mentioned adverse effects.

Despite all of the efforts which have been exerted toward improvement of designs and rig floor assemblies, there still remains a need for improved couplings that can be used with existing inventories of A.P.I. pipe. Furthermore, such improved couplings should facilitate reliable and uniform pipe makeup on the rig floor and require no more time than is presently used for standard pipe makeup. There is also need for precise sealing and mechanical engagement in other contexts as well, such as pipe lines using A.P.I. couplings. In some long pipe lines threaded couplings are used because corrosive fluids require plastic coatings that would be damaged by welding temperatures. Extremely high stresses may be introduced along the pipe axis by thermal expansion and contraction, but at the same time the pressure seal must be maintained.

SUMMARY OF THE INVENTION

Threaded couplings in accordance with the invention incorporates a pair of oppositely facing, precisely separated, reference shoulders defined by a centrally disposed precision metal makeup ring interior to a pipe collar meeting A.P.I. standards. When pipe is threaded into engagement with the makeup ring, a deformable seal within the collar adjacent the reference should abuts the side of the nose end of an inserted pin. Also, a seal ring in the exterior end of the collar engages the opposite end of the pin. Thus metal-to-metal contact assures a precise axial position in which there is full dimensional engagement of thread surfaces, while the threaded region is sealed off by compressed seals and solely required to react against axial stresses along the pipe. Neither internal pressure within the pipe nor external pressure can penetrate into the threaded region. However, at the same time, a selected bearing pressure may be established for a given axial stress by selection of a collar having a particular spacing between the reference surfaces on the internal makeup ring. If the interior seal is damaged or lost, the external seal still provides a barrier to a predetermined pressure threshold. However, if pressure continues to build up, the exterior seal releases to vent to the outside, this seal again becoming effective against external pressure thereafter. The internal ring surface may be disposed flush with the internal diameter of the pipe, reducing internal turbulence to a minimum.

In one example of a coupling in accordance with the invention, a standard A.P.I. collar may readily be modified by removal of the threaded central crest within the collar to provide a seat for a compressible seal ring within which is fitted a precision position ring. Opposite ends of the seal ring have tapered surfaces that mate with side bevels of the nose of an engaged pin. At the end recesses of the collar, outside the load bearing region, grooves are provided to receive elastomeric seal rings. These rings engage the pin just outside the last scratch mark and compress further in response to external pressure. However, they also release outwardly in response to internal pressure in excess of a predetermined threshold, while thereafter retaining their effectiveness as external seals. The grooves in which they are seated have side walls forming a diverging angle so as to provide frictional restraint against rotation of the seal ring during pin engagement.

In methods in accordance with the invention, selection of proper reference shoulder position and modification of pipe collars, if necessary, are accomplished while making up half of the coupling away from the rig floor. One pin is threaded into a desired insertion position with adequate thread engagement but without excessive stress. For modified A.P.I. pipe the position may be defined by a temporary reference member which is thereafter removed so that a position ring may be placed in abutment with the nose of the inserted pin. In this position the internal seal is contacted by the nose of the pin and the external seal is under compression at the root of the threaded portion of the pin. The position ring then defines the positional reference for the nose of the opposite pin. The only step required for makeup of the pipe length in the pipe string on the rig floor is to rotate the next pin into metal-to-metal contact with the opposed reference shoulder. At this point, both the interior and exterior seals are properly engaged on the newly inserted pin as well as the other half of the coupling. Existing collars may be modified at the pipe rack by removing the central crest portion of the threaded region and inserting a center seal ring. The precision makeup ring may be of selected length, so as to control the tightness of the makeup for given axial stress conditions.

Further in accordance with the invention, prescreening of pins and collars for taper is employed to provide that insertion positions will vary only within a limited range (e.g. ±⅛" total). A smooth interior taper on a reference ring that fits over a pin end is used to establish that the pin taper is acceptable, while a smooth reference cone may be used to make a similar check on the collar taper. The prescreening eliminates only a minor proportion of pipe and collars meeting A.P.I. standards, but reliably establishes that pipe position relative to the collar will assure seal integrity and performance under tensile loads. In the course of coupling pipe to modified A.P.I. collars, precision reference elements are threaded into the collars to control the depth of insertion of the first pin into the collar. Thereafter this element is removed so that the seal and precision makeup ring can be inserted.

In another example of a device in accordance with the invention, the collar is manufactured to incorporate an integral precision position ring, having reference shoulders on opposite sides and inset internal seals at the juncture of the threaded regions with each of the reference shoulders, as well as exterior seals in the end recess regions. Such collars provide greater resistance to bending, and expansion due to mid-region pressure, and may therefore be used with benefit in directional wells. In using these collars to make up pipe strings, adequate seals and thread engagement are both assured simply by assuring metal-to-metal contact of both pins against the respective reference shoulders of the position ring.

Couplings in accordance with the invention are particularly suitable for use with plastic coated pipe because the abutting metal surfaces provide a complete plastic seal without special modification. In spraying the interior of the pipe and precision makeup ring adequate coating is applied to the side surfaces, so that when they are brought together and compressed corrosive gases interior to the coupling are blocked even from the internal seal. Further in accordance with the invention, a ridged contact surface is provided on the reference shoulders of a precision makeup ring. An inserted pin end that is slightly canted relative to the plane of the reference shoulder tends to wipe and deform the ridged portion in reaching full engagement, so that complete contact is established. In accordance with a different feature, a modified or bullet-nose A.P.I. pipe may be matingly received by a modified collar using a two-piece seal ring and having a concave reference shoulder surface.

BRIEF DESCRIPTION OF THE DRAWINGS

A better understanding of the invention may be had by reference to the following description, taken in conjunction with the accompanying drawings, in which:

FIG. 5 is a fragmentary sectional view showing an end seal in uncompressed form;

FIG. 6 is a perspective view, partially broken away, of a different coupling in accordance with the invention;

DETAILED DESCRIPTION OF THE INVENTION

Figure 1:
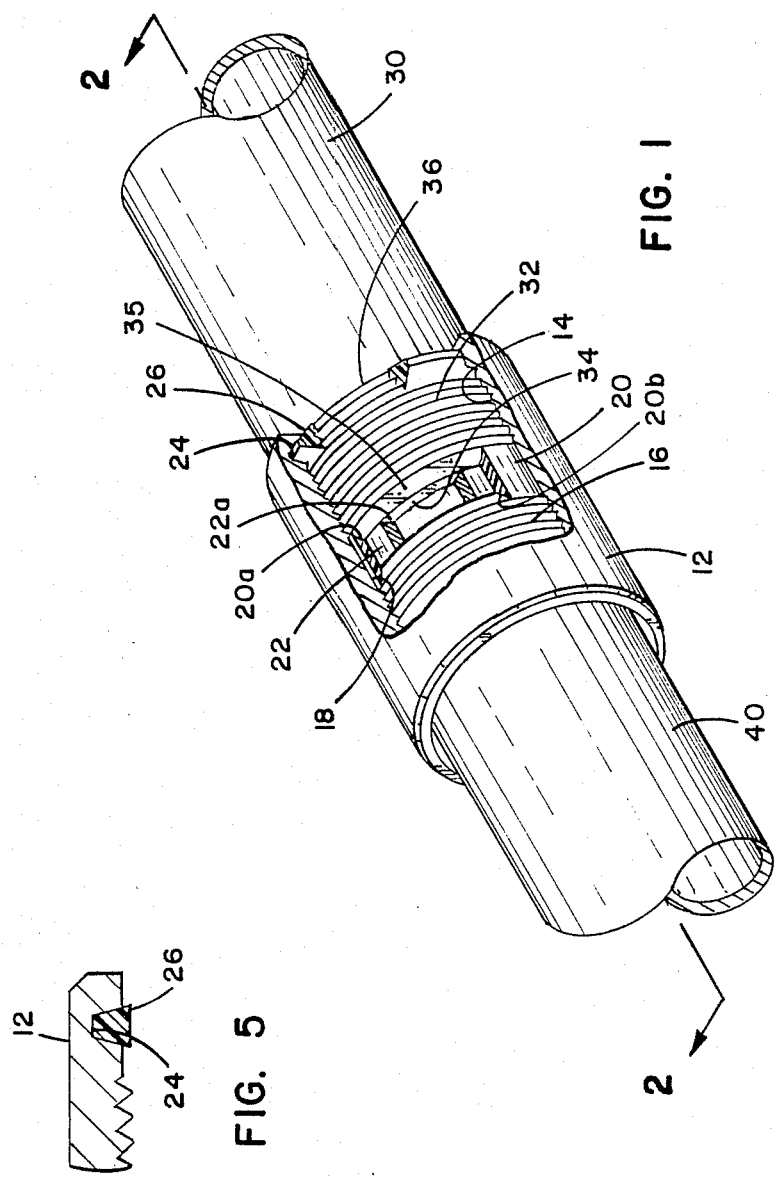
FIG. 1 is a perspective view, partially broken away, of a coupling using modified A.P.I. elements in accordance with the invention.

In accordance with the invention, referring now to FIGS. 1-5, a coupling 10 for production wells comprises a modified-A.P.I.-type tubing or casing. The collar or box 12 has conventional first and second threaded tapers diverging from the central collar region, the dimensions and tolerances being within the specified A.P.I. limits. In the standard A.P.I. collar the threaded tapers 14, 16 come together at a central crest region, which in accordance with the invention is machined out to provide a center land 18 which forms a seat for an interior seal ring 20 having tapered edges at each side. This seal ring is preferably made of a material sold as "RYTON" by the Du Pont Company of Wilmington, Del. This material is an elastomer that is displaceable under applied force and pressure to provide a leak free seal, and is capable of withstanding the corrosive chemicals, such as hydrogen sulfide, pressures and temperatures encountered in deep completion operations. It also expands (up to 3%) under high temperature conditions, providing a better seal in more critical environments.

Figure 2:
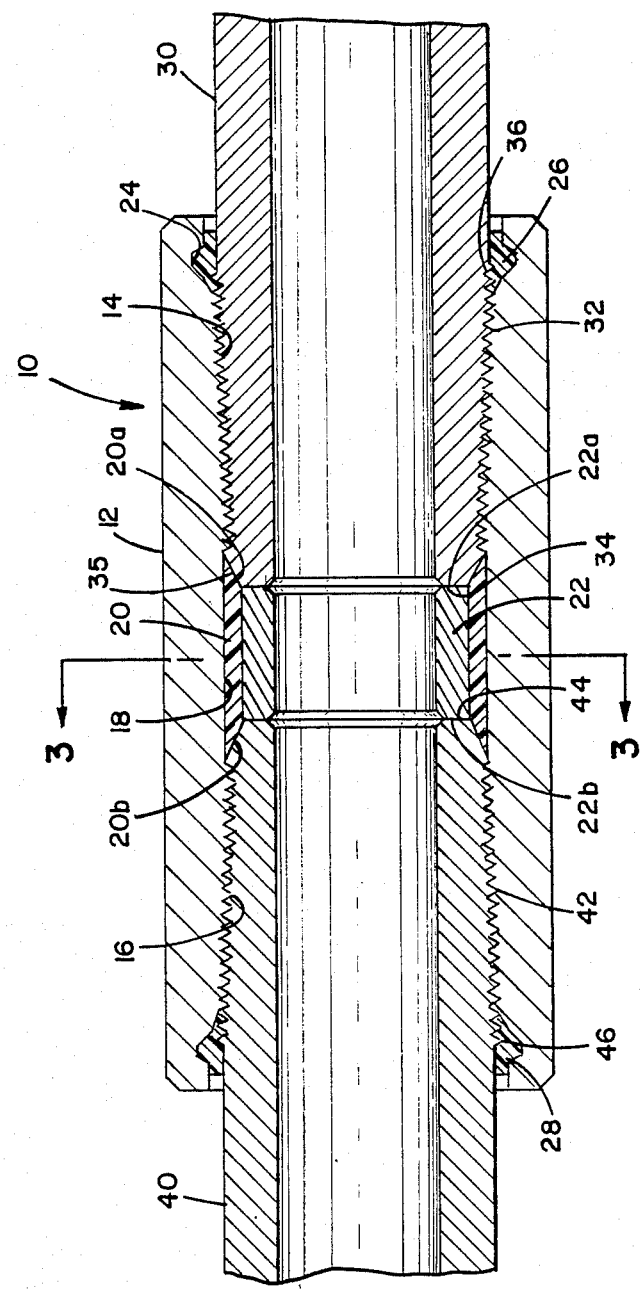
FIG. 2 is a side sectional view of the arrangement of FIG. 1.
Figure 3:
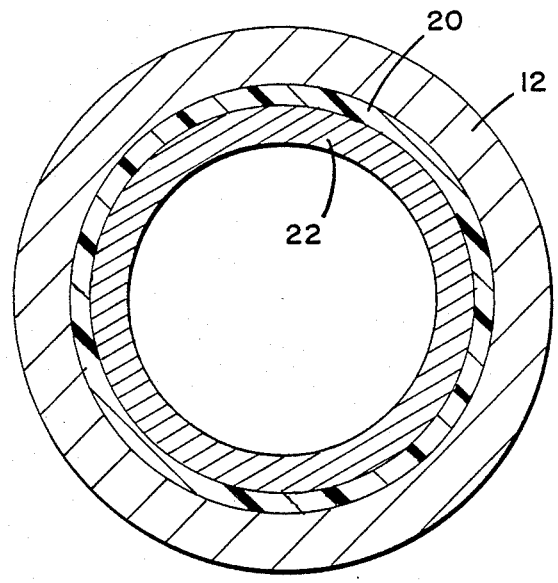
FIG. 3 is a cross-sectional view of the arrangement of FIGS. 1 and 2 taken along the line 3—3 in FIG. 2.
Figure 4:
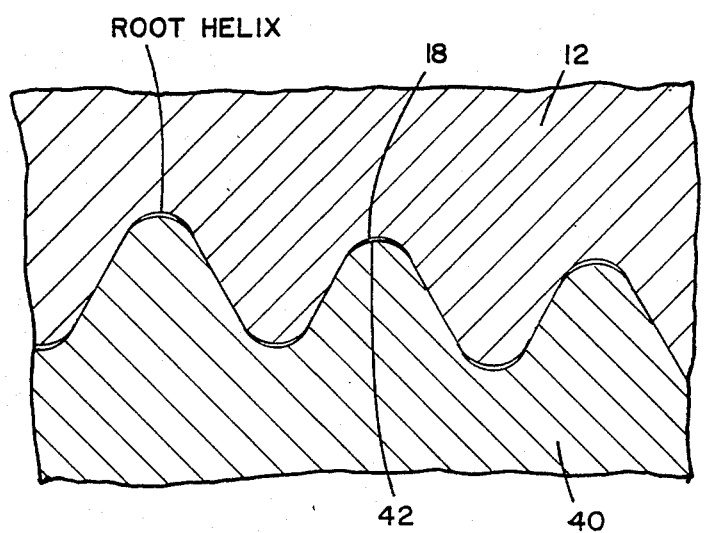
FIG. 4 is an enlarged fragmentary side sectional view of the threaded region in the arrangement of FIGS. 1-3.
Figure 7:
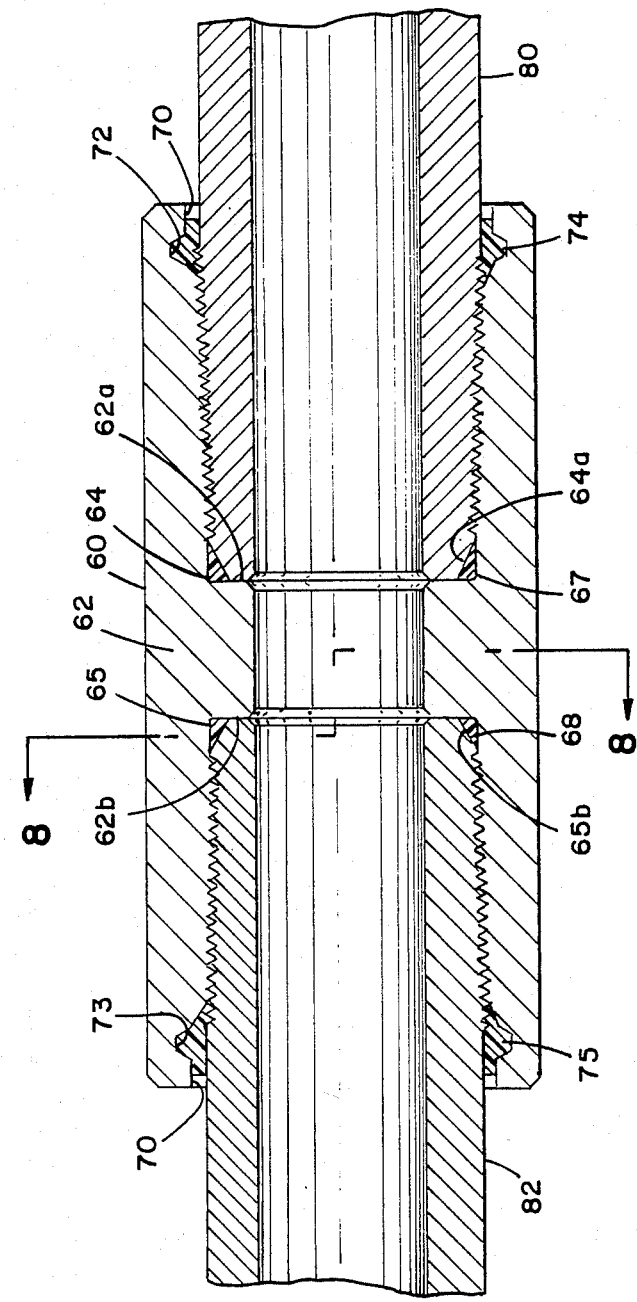
FIG. 7 is a side sectional view of the arrangement of FIG. 6.
Figure 8:
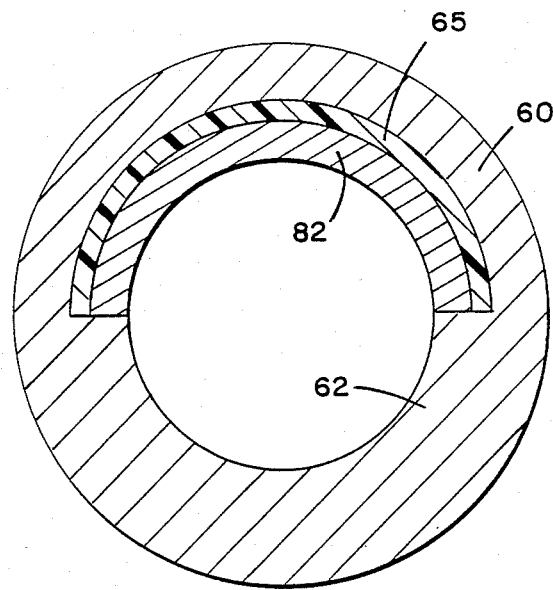
FIG. 8 is a cross-sectional view taken along the line 8—8 in FIG. 7 and looking in the direction of the appended arrows.
Figure 9:
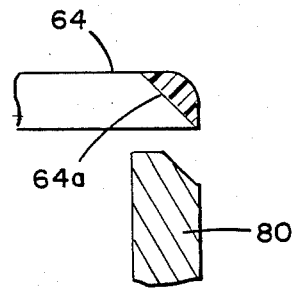
FIG. 9 is a fragmentary sectional view showing the relationship of the uncompressed seal to the bevelled surface of a coupling in accordance with the invention as depicted in FIG. 6.

Within the interior seal ring 20 is disposed a precision position ring 22 having a longitudinal dimension along the axis of the collar 12 that is selected for the particular type and size of collar that is used, also with a thickness to match the wall thickness of the pipe body to be used. As described below, the weight and grade of pipe being used, together with the bearing pressure desired for makeup, determine the axial spacing that is to exist between the reference shoulders 22a, 22b. The pipe wall thickness determines the radius of the position ring 22, in order that a flush profile can be established. At each outer end of the collar, in the "end recess" portion, immediately adjacent each threaded taper region 14 and 16, is machined an end groove seat 24 within which is seated an exterior seal ring 26. The pin end of a first pipe 30 is threaded into the collar 12 such that the threaded taper 32 on the pipe 30 is in secure engagement with the opposed threaded taper 14 of the collar, with the nose 34 of the pipe 30 being in engagement with the first reference shoulder 22a on the ring 22. The manner in which the depth of engagement of the first pipe 30 may be controlled is described in detail hereafter. However, when properly positioned, the nose 34 of the first pipe 30 not only engages the first reference shoulder 22a, but compresses the side surfaces of the interior seal ring 20. A 25° bevel surface 35 on the pipe 30 adjacent the nose 34 engages a similarly beveled seal surface 20a on the center seal ring 20, forming a firm seal against high interior pressure. The last thread region 36 of the first pipe 30, i.e. the region of maximum diameter adjacent the threaded taper 32 concurrently engages the exterior seal ring 26, compressing it inwardly relative to the collar 12. This forms a firm seal that is only further compressed by exterior pressure. As best seen in FIGS. 2 and 5, the side surfaces of the seal ring 26 taper outwardly at approximately at 60° angle from the end groove seat 24 in the end recess of the collar 12. This is a mechanically unloaded portion of the collar, being outside the threaded region, and can readily withstand the external pressures that are likely to be exerted. The diverging angle on the seal 26 provides a greater surface area of contact against the bottom and side walls of the end frictional engagement. A lubricant may be spread on the inside of the seal ring 26, so when it is engaged by the last thread region 36 of the piper 30, the beveled side edges and narrow end of the seal ring 26 frictionally engage the groove seat 24, substantially eliminating any tendency of the seal ring 26 to rotate or do anything other than compress relative to the inserted pipe 30.

In similar fashion, a second pipe having a threaded taper 42 in engagement with the second threaded taper 16 on the collar, abuts the second reference shoulder 22b, and its nose 44 compresses the tapered side surface 20b of the interior seal ring 20, while its base 46 compresses the second exterior seal ring 28. It will be appreciated that thread lubrication compound is used in the threaded engagement regions, being applied prior to makeup. Further, the amount of deformation of the various seals can be greater or less than is shown (the drawings are not to scale), inasmuch as internal and external pressures respectively merely act on the seals 20, 26 and 28 in senses that tend to increase the integrity of the seal.

With this structure in accordance with the invention, a coupling is provided that satisfies a number of requirements that have hitherto involved limiting compromises. Load bearing strength is provided by virtue of precise thread engagement, which is established by metal-to-metal contact between the noses 34, 44 of the pins and the facing reference shoulders 22a, 22b. Pipe tolerances are adequate to insure load-bearing strength, even though a high pressure seal may not exist in the threaded area from bearing pressure alone. However, the sealing requirements are met concurrently, because with the pipe ends being positioned accurately, the interior seal 20 and the exterior seals 26 and 28 are engaged and compressed securely. Consequently the threaded engagement region is not under ordinary circumstances exposed to any such leakage. Concurrently, the interior surface of the position ring 22 lies flush with the interior surface of the pipes 30, 40, so that flow passing along the string does not encounter a turbulent region in the middle of the coupling. In addition, the abutment of the pipe noses against the opposite reference surfaces 22a, 22b of the ring 22, provides a constricted path that considerably limits any tendency of internal pressurized gases or fluids to penetrate outwardly.

At the outer ends of the collar 12, the exterior seal rings 26, 28 are so shaped and positioned that they are compressed by the last thread regions 36, 46 of the engaging pipe. Exterior pressure again increases the integrity of the seals. In the event that the interior seal 20 is damaged or defective, so that leakage of internal fluid passes into the threaded region, distortion of the exterior seal rings 26, 28 is adequate to limit outward leaks up to a certain pressure limit. Selection of the size and shape of the exterior seals 26, 28 is readily variable to provide resistance to internal pressures of a selected amount. A slight taper to match the thread taper and an inner diameter that is sufficiently large to clear the pipe threads to about the mid-region are best seen in the uncompressed state evidenced in FIG. 5. These geometries provide firm sealing in response to external pressures, but adequate deformation to release internal pressures in excess of a selected level, here about 2000 psi. Size and taper variations may be used to increase or decrease the chosen threshold level. Consequently, at internal pressures in excess of the selected threshold, the gases are vented outside the tubing rather than having the coupling come completely loose. The seal rings 26, 28 maintain their integrity and, when venting has ceased, again function as effective barriers against external pressure.

From the standpoint of mechanical loading stresses arising in a long tubing or casing string, therefore, it is not necessary with this concept to provide an extremely tight makeup in order to establish a leak-free seal. Bearing stresses can be defined solely in terms of the axial load (e.g. length and weight of string) to be utilized. This therefore constitutes a marked departure from accepted practice, in which the end region of a pipe is stressed to approach the yield point so as to assure a leak-free seal, with the resultant galling, reduction of number of uses and dangers of overstressing that can occur. Production rig testing procedures, such as those which test a coupling by exposing it to high pressure gases which are then sensed for leakage or fluids such as water or water treated with soluble oil, are furthermore needed in fewer situations. For the same reason, A.P.I. standard pipe can be used for a wider range of applications involving higher pressures and axial stresses. The much more expensive couplings and pipe currently employed for extremely long tubing or casing strings an d high pressure applications can be confined to a smaller number of the more critical situations. Pipe with imperfections and defects pertaining to the sealing functions only may now be usable.

Selection of grade and weight of tubing for a particular application can thus be accompanied by a selection of the degree of engagement required for particular casing and completion conditions. For example, some gas wells require only short strings, but are at extremely high pressures, and for these applications axial stress loading is much less than for extremely long strings. Consequently, for such applications a lesser tightness of thread engagement is used, so that both assembly and disassembly of tubing strings can be accomplished more rapidly. For this purpose, systems in accordance with the invention can utilize one of a number of available precision makeup rings. A set of four different taxial length sizes of precision makeup rings 22 and seal rings 20 are sufficient to cover all ranges of applications. In the present example, for 8 round A.P.I. pipe, these vary from ¾" for the smallest to 1¼" for the largest. In other words, couplings which are to withstand high stress can be given two turns (1 turn=⅛") more on each pin relative to the couplings which are least firmly engaged and which therefore have longer makeup rings. Any intermediate spacings that are desired can be used between these limits, but only two intermediate dimensions between the limits (four in all) are generally found sufficient. By changing the length of the seal ring 20 correspondingly the beveled surface 20a providing the interior seal still securely engages the side bevel adjacent the nose of the pin. It will be recognized that the seating area established by removing the crest of the threads is also similarly proportioned.

In systems in accordance with the invention, it should be noted that pipe taper is the only significant variable, both dimensions and angle being encompassed. Techniques are disclosed hereafter for testing whether pipe tapers are within an acceptable range, with a minor proportion of pipe being rejected for this reason. Having prescreened the pipe for this characteristic, the metal-to-metal contact that is positively assured when the pin noses engage the adjacent reference shoulders automatically insures both the internal and external seals. It should further be noted that there are no internal stress risers introduced by the sealing structure, that the full integrity of thread engagement is maintained, and that all conventional features of operation are maintained. Coupling of the collar to the pipe to the hand tight plane remains as before. If permissible under field conditions a visual check may be made of the last scratch position relative to the collar when engaged.

With modified A.P.I. structures in accordance with the invention, existing stock can be converted to improved coupling simply by removing the threads in the center crest to provide the center seal seat 18 and by machining the end groove seats 24 in the end recesses of the collar 12. The prefabricated center seal ring 20 and the exterior seal rings 26, 28 can be inserted by hand, but the precision position ring 22 requires considerable force to insert in position against a reference surface, as described hereinafter. This type of work can all be accomplished at a pipe rack or pipe storage facility and requires no special machining procedures because this type of equipment is used in regular assembly, inspection and maintenance of pipe.

Where a factory supplied collar 60 is to be used, the construction may be as shown in FIGS. 6-9, to which reference is now made. The collar 60 incorporates a central position reference ring 62 that is integral with the collar 60 body and has an inner circumference flush with the inner circumferences of engaged pipe, and end shoulders 62a, 62b that are axially separated by a selected spacing. Four different spacings within a predetermined range may again be used for providing different makeup tightness, as described previously. First and second center seals 64, 65 are positioned in grooves 67, 68 each disposed between a different end shoulder 62a or 62b and the adjacent threaded portion of the collar 60. These seals 64, 65 include beveled surfaces 64a, 65a for mating with the 25° side bevel surfaces on the pipe, as previously described.

At the end recesses 70 of the collar 60, a pair of groove seats 72, 73 retain end seals 74, 75 as previously described.

It may be seen that the construction of FIGS. 6-9 has all of the characteristic advantage of the arrangement of FIGS. 1-5. Full but not excessive thread engagement is assured when the first and second pipes 80, 81 are fully engaged with nose-to-metal contact with the end shoulders 62a, 62b respectively. Concurrently, secure center and end seals are established as previously described. This unit has the additional advantage of providing greater versatility in assembly, because precise couplings can be fully made on the rig floor. In addition, the manufactured coupling has a thick integral center section and therefore is much stronger in bending, and much more resistive to expansion due to internal pressures. Consequently such couplings are preferred for use in situations in which the string has a high slant angle or changes in direction combined with high pressure.

Figure 10:
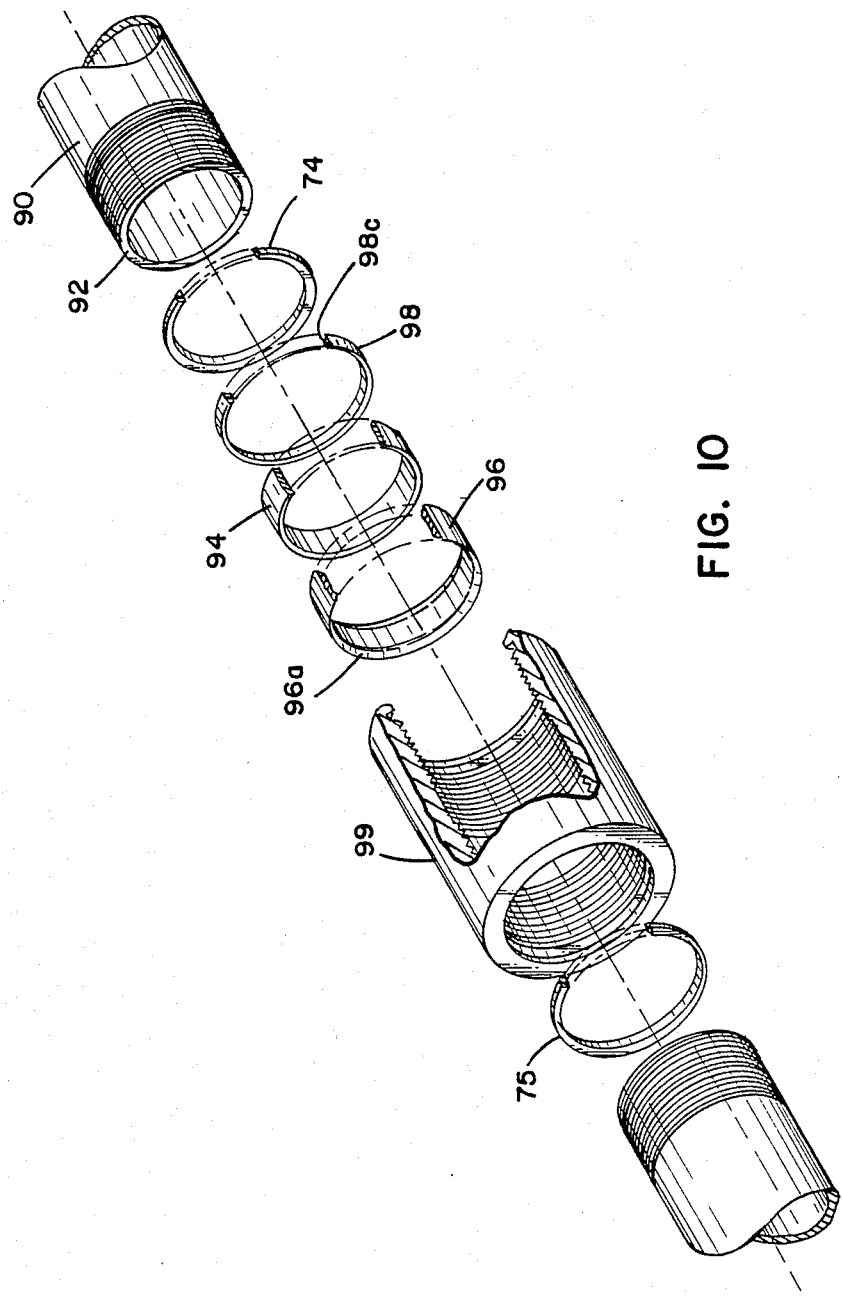
FIG. 10 is an exploded fragmentary view of a different example of a coupling in accordance with the invention used with bullet-nosed pipe.
Figure 11:
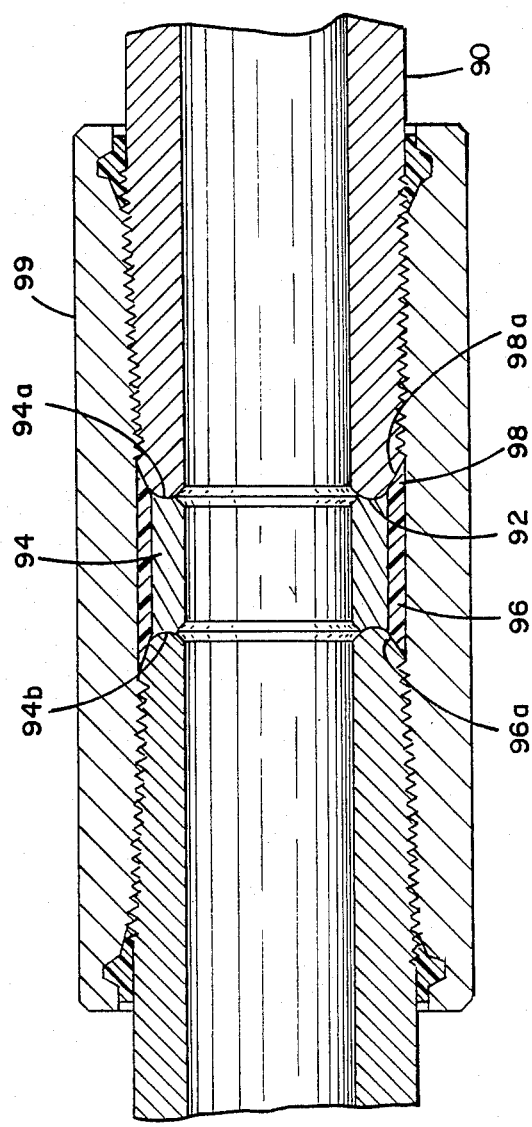
FIG. 11 is a side sectional view of the assembled construction of FIG. 10.

The system is also amenable to usage with so-called bullet-nosed pipe, as shown in FIGS. 10 and 11. Bullet-nosed pipe 90 has had the pipe end 92 machined to a convex configuration as opposed to the flat end and side bevel previously described. For this type of pipe 90, the precision makeup ring 94 incorporates concave side reference surfaces 94a and 94b while the center seal is fabricated in two parts of a principal seal ring 96 having a concave side surface 96a, and a minor seal ring 98 with a concave side seal surface 98a. As shown in FIG. 10, the side seal surfaces 96a and 98a in the uncompressed condition are oversize relative to the precision makeup ring 94, and internally projecting portions of the concave side surfaces 96a, 98a would be damaged if the ring 94 were forced in over them. Thus this unit is assembled first by putting in the principal seal 96, sliding the makeup ring 94 over the flat interior surface on the principal ring 96, and thereafter inserting the minor seal ring 98 so that there is full metal and seal contact to the bullet noses of the pipe 90. The collar 99 remains as described above in conjunction with FIGS. 1-5.

Figure 12:
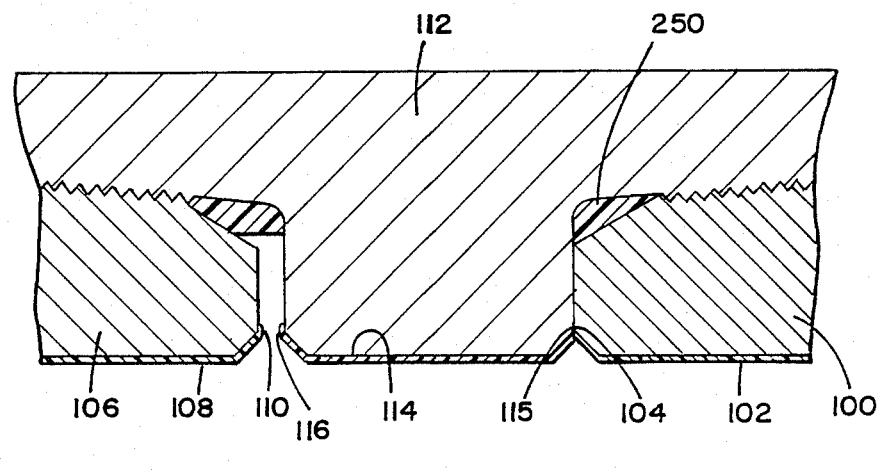
FIG. 12 is a side sectional view of an example of the invention as utilized with plastic coated pipe.

The example of FIG. 12 illustrates important advantages of constructions in accordance with the present invention for plastic-coated pipe, which is now much widely used for the superior resistance of the pipe to extremely corrosive environments. The practice generally is to roughen the interior surface of the pipe so as to provide better adhesion of the temperature and corrosion resistant synthetic polymer-based mixture (e.g. "RYTON") that is used. In addition, masking techniques are used to apply plastic from the inside of the pipe in a path that extends around the nose and beveled sections and to two or three threads of the pipe. With standard A.P.I. pipe couplings the danger regions are at the corners encountered at the pipe ends, because of the fact that the applied plastic is thinner is these regions, and at the threaded portions, because thread engagement when inserted into the collar tends to tear and crack rather than compress the plastic.

In accordance with the invention, as shown in enlarged form in FIG. 12, a first pipe 100 having an adhering plastic layer 102 on the inside surface will also receive a lesser amount of overspray 104 at the nose end corner of the pipe 100. A second pipe 106 has a similar interior layer 108 with an overspray region 110 immediately adjoining at the pipe nose. This is all of the marginal coating that is required, inasmuch as the precision makeup ring 112, having an internally roughened surface, also includes an interior surface layer 114 of plastic, some of which extends onto the side edge surfaces as lip surfaces 115, 116. Thus, when metal-to-metal contact is established, the overspray 104 and 110 areas on the pipe 100, 106 respectively are compressed against the plastic lip surfaces 115, 116, compressing and displacing the surfaces to provide a complete seal along the length of the pipe. In addition, the flush inner surface of the ring 112 with the pipe inner circumferences greatly reduces the turbulence in this area, and the high velocity forces that would otherwise act on the pipe edges, where the plastic coating would be the most thin.

Field use of systems and devices in accordance with the invention is greatly facilitated by prescreening of pipe so that pipes which have excessively shallow or steep tapers are not used. API standards permit degrees of taper variations which are sufficient to allow combinations at opposite extremes (shallow taper on the collar with a steep taper on the pin or vice versa) of ±2 threads, which gives a total variation of one-half inch. In accordance with the present invention, however, it is desired to use pipe whose taper varies so as to give a maximum difference of one thread on the maximum side. This constitutes a maximum variation of one-eighth inch from the nominal position, and solely arises from the taper, not the condition or the tolerances of the threads themselves. Field experience has shown that only 2% to 6% of pipe manufactured to A.P.I. tolerances will not meet this requirement, but this factor must be checked in the field, at the pipe rack or similar station, prior to engagement of the collar onto the pipe. The ring 120 of FIG. 14 and the plug 130 of FIG. 15 provide convenient mechanisms for this prescreening.

Figure 14:
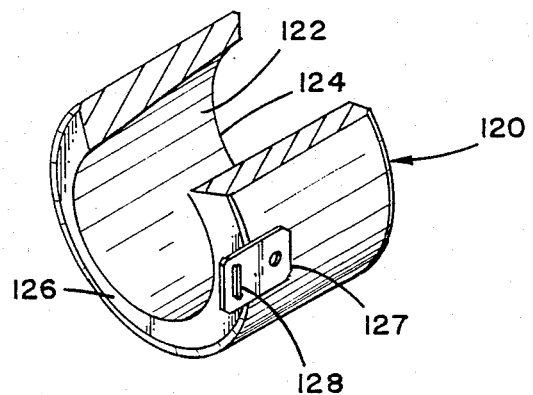
FIG. 14 is a perspective view, partially broken away, of a precision reference cone ring that may be used in assembly techniques in accordance with the invention.
Figure 15:
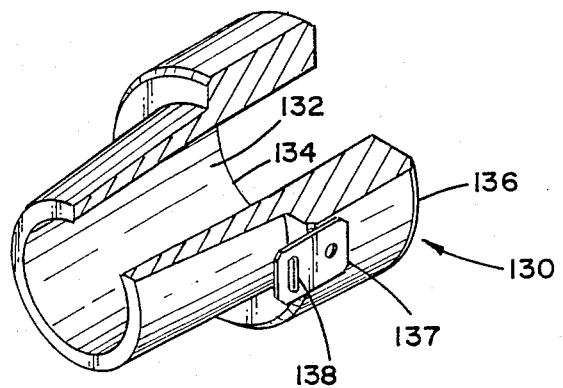
FIG. 15 is a perspective view, partially broken away, of a precision reference cone plug that may be used in assembly techniques.

The gauge ring 120 of FIG. 14, to which reference is now made, includes an interior conical surface 122 tapering from a wider end 124 to a narrower end 126 of the ring. An ear 127 attached adjacent the narrower end 126 includes a viewing window 128 having an axial length along the central axis of the ring 120 that corresponds to an acceptable range of displacements for the nose end of a pin inserted into the opening defined by the interior conical surface 122. When the ring 120 is fitted over the nose end of a pipe which has a shallower taper than a standard defined by the smooth interior conical surface 122, (the diameter of the pipe being substantially invariant) the ring 120 will not slip over the threaded portion until the pipe end is within the center of the viewing window 128 as desired, but will instead be closer to the smaller end 126 of the cone 120. If, on the other hand, the taper is sharper or steeper than the desired standard, then the end of the pin will penetrate past the center of the viewing window 128. In either event the pipe is unacceptable if the nose does not rest somewhere within the boundaries of the viewing window 128.

In like fashion, a gauge plug 130 may be used for checking the taper on the collars. A smooth conical surface 132 tapers together from an insertion end 134 within a larger base 136, from which extends an ear 137 incorporating a viewing window 138 if the taper on the collar is too shallow, the penetration will be less, and the end of the collar will not reach the viewing window 138, whereas if the taper is steeper the penetration will be past the viewing window 138. In both instances, the relative position of the end of the tubular member is directly dependent upon the taper, which is established by the smooth internal or exterior reference surface of the ring 120 or plug 130.

Figure 16:
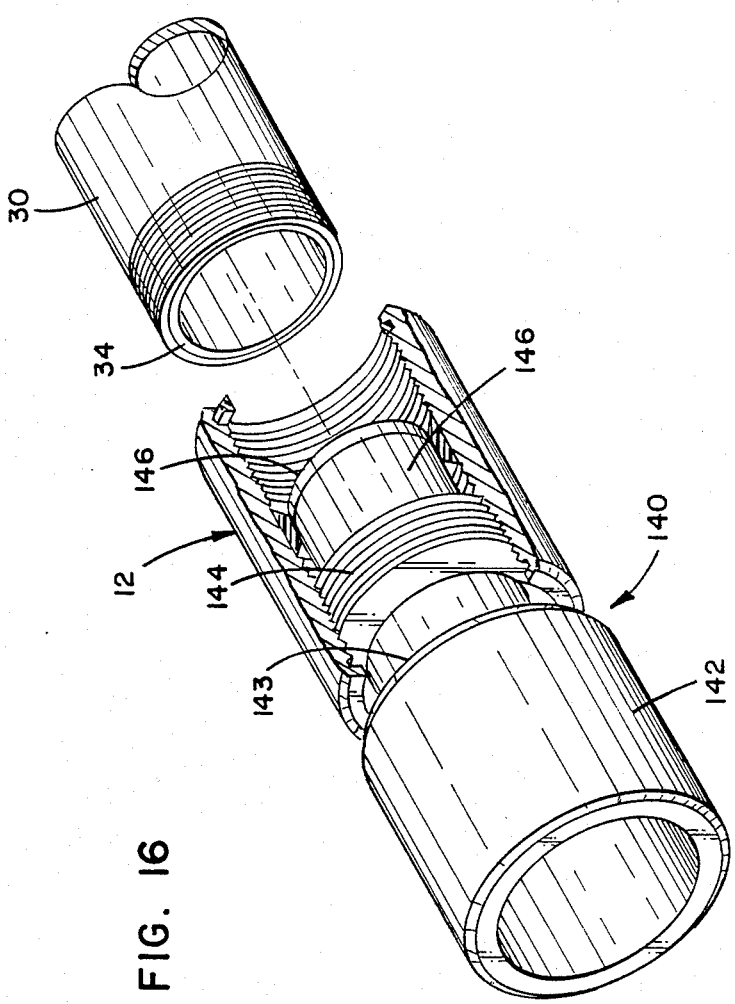
FIG. 16 is a perspective view of a reference insertion plug that may be utilized in assembly techniques in accordance with the invention.

One other tool is valuable in assembly techniques in accordance with the invention, and this is shown as a preset plug 140 in FIG. 16. The present plug 140 comprises a body portion 142 used for hand or machine tightening and removal with a bucking tool. Accordingly, the body 142 has a circular outer surface terminating in a reference shoulder 143 that lies in a plane normal to the central axis of the body. A threaded portion 144 stands coaxially from the body 142 to define a precision male threaded region for mating with an A.P.I. collar 12 of the desired type. An end 146 of the preset plug 140 projecting beyond the threaded portion 144 includes a replaceable hardened end face 148 which is precisely spaced apart from the reference shoulder 143. When the plug 140 is threaded into a collar 12, the reference shoulder 143 is engaged against the end of the collar. Then, the end face 148 is in a known position, defining the depth of penetration for a first pipe 30 to be inserted from the opposite end. The pipe 30 is simple tightened until metal-to-metal contact is obtained between the nose 34 of the pipe and the end face 146. Thereafter, with the pin 30 in position, the preset plug 140 is removed, so that a center seal and a precision makeup ring (not shown) can then be seated against the nose of the engaged pipe and the coupling fully readied for use on the rig floor.

Figure 13:
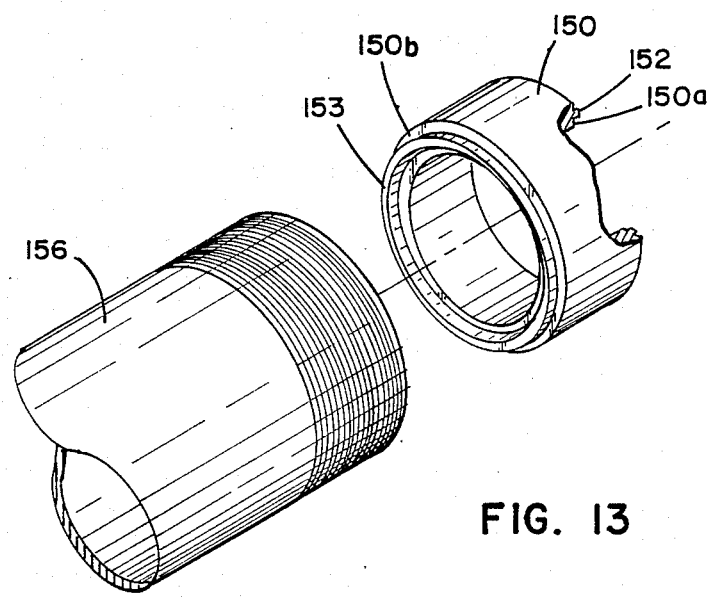
FIG. 13 is a perspective view of a modified precision makeup ring that may be utilized to compensate for pin irregularities.

A modification of the precision position ring, which can be used on integral as well as inserted rings, is shown in FIG. 13. This ring 150 (shown as a separate insertable element for modified A.P.I. pipe for purposes of illustration only) has spaced apart reference shoulders 150a, 150b as previously described. However, these surfaces includes concentric, centrally disposed, ridges 152, 153 respectively. If the nose end of an inserted pipe 156 is not in a plane precisely parallel to the opposed reference shoulder 150b, the forward edge of the nose tends to cut a deepening groove in the reference shoulder before full contact is achieved. This lack of parallelism occurs because the pipe end is not precisely cut off in fabrication and although it may not exceed a few mils, the discrepancy can have a greater effect on the precise positioning of the pipe 156 relative to the reference shoulder 150b and seals (not shown). When the deformable ridge is encountered, however, a wiping action takes place that conforms the contacting metal surfaces and assures full mating of the opposed elements around their peripheries on solid metal-to-metal contact.

Figure 17:
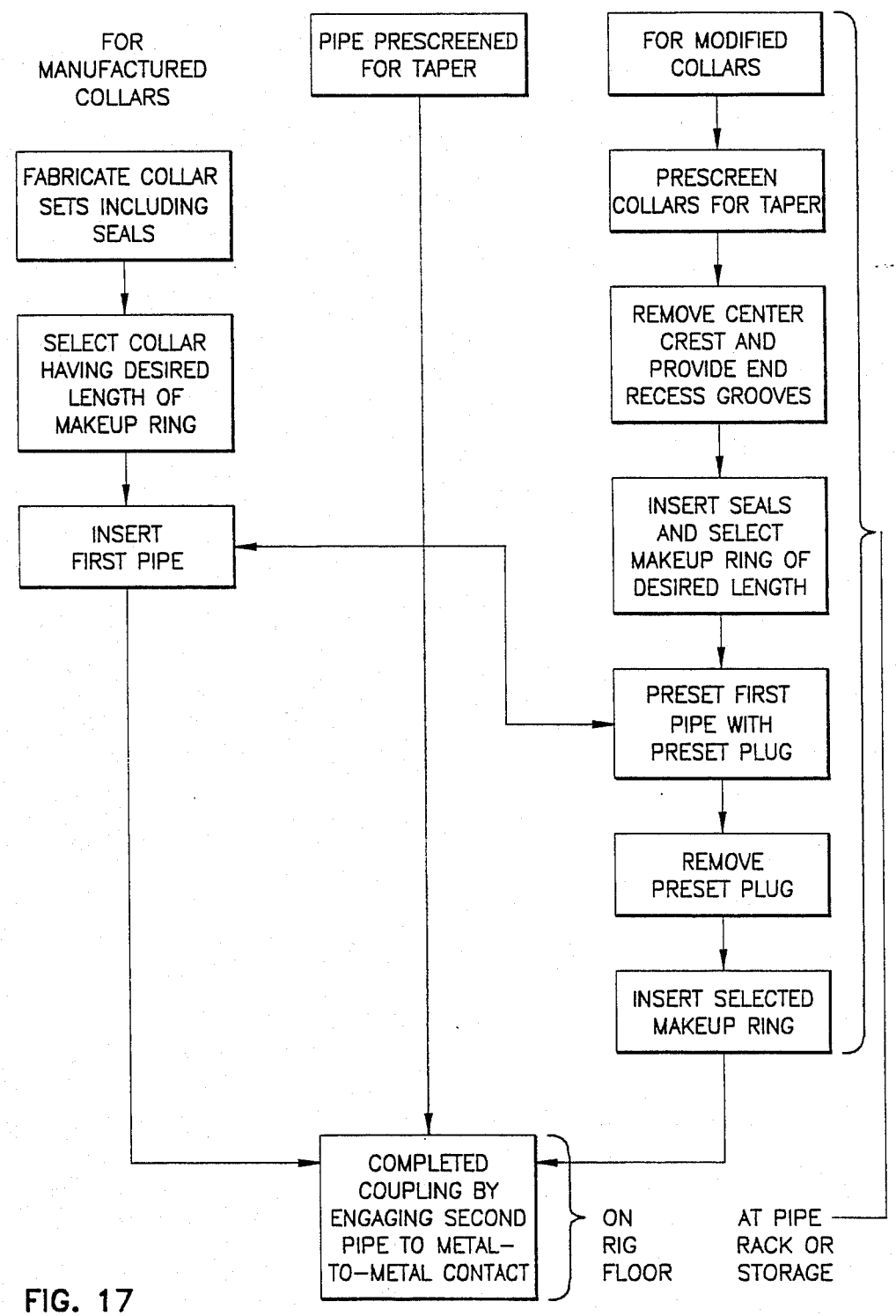
FIG. 17 is a flow diagram of steps that may be employed in methods in accordance with the invention.

Methods in accordance with the invention, depicted in sequential form in FIG. 17, may use modified or manufactured collars as described herein, but in any event preferably prescreen the pipe. That is, the taper of each pin end is checked, using the reference ring of FIG. 14, the determine that the depth of penetration will be ±⅛" relative to the standard. Only dimension and taper angle affect this determination, and it is not necessary to check thread pitch or profile. If a manufactured collar is to be used, it will previously have been prescreened for taper during quality control checks, and it is only required to select the degree of makeup tightness desired for the axial stress to be encountered. On the basis of length of string and other conditions to be encountered, the axial stress to be met is determined by operating personnel in terms of grade and weight of pipe and dimensional penetration of the taper for the couplings. Selecting the collar having a particular length of makeup ring is determined by these criteria. Makeup of the couplings merely requires engagement until metal contact is made, for both pins, and this can be done at the pipe rack for one pin or on the rig floor for the opposing pins. The precise dimensional control that is achieved assures full thread engagement for withstanding tensile loads, without dangers of overstressing or deformation. It is not necessary to attempt to achieve a "power-tight makeup" in accordance with A.P.I. procedures or to increase bearing pressure until adequate sealing against high pressure is obtained. The internal and external elastomeric seals that are concurrently established on dimensional engagement provide superior barriers against pressure differentials. Because they also isolate the threaded region, the importance of thread continuity is diminished and thread cuts, marks or irregularities previously regarded as imperfections sufficient to constitute rejectable defects may now present no significant problem. Thus, pipe previously rejected for such imperfections may now be usable in many applications.

Where an A.P.I collar is to be modified the sequence is longer but the end result on final makeup is the same. The collars also are prescreened for taper, using the reference cone of FIG. 15, to assure that they are within ±⅛" variance from standard. The acceptable collars are then modified by removing the central crest region of the threads to provide a seat for the center seal, and machining in the grooves in the end recesses. The center seating region is proportioned in length to the makeup ring and seal to be installed. The seal rings are then urged into position, which may be done manually, and the preset plug of FIG. 16 is inserted to maximum depth. The present plug is chosen in correspondence to the makeup ring to be used, so that when fully engaged its end face is in the plane of full insertion of the nose end of a first pipe. By threading the first pipe into contact with the end face, the first pipe is precisely positioned and the present plug may be removed. Insertion of the selected precision makeup ring into firm contact with the nose of the first pipe requires substantial force, so that a shouldered driving tool is used. When the makeup ring is in position, however, the coupling is ready to receive the second pipe on the rig floor. The crew need only stab and rotate each section into the prior section until metal contact is made with the makeup ring. This firm engagement alone is enough to assure a proper mechanical engagement and full sealing against both internal and external pressures.

Although it will be appreciated that a number of forms and modifications of systems, devices and methods in accordance with the invention have been described, it will be appreciated that the invention is not limited thereto but encompasses all variations and modifications falling within the scope of the appended claims.

What is claimed is:

1. The method of coupling sections of pipe for assembly into a production tubing or casing string comprising the steps of:
    (a) entering a reference member from a first end of a collar, the collar being a standard A.P.I. collar having a first and second tapered internally threaded end portions, the reference member provided an interior abutment surface for controlling the depth of penetration of a first pipe, the first pipe having tapered external threaded end portions;
    (b) removing the reference member after inserting the first pipe into threaded engagement with the collar and a first end portion thereof in abutting contact with the interior abutment surface;
    (c) inserting a position ring of selected length for an axial stress to be encountered along the string, within the collar with one end of the ring in abutment with the first pipe; and
    (d) then engaging the second pipe into threaded engagement with the collar and an end thereof in contact with the other end of the position ring.

* * * * *

UNITED STATES PATENT AND TRADEMARK OFFICE
CERTIFICATE OF CORRECTION

PATENT NO. : 4,878,285

DATED : November 7, 1989

INVENTOR(S) : Kenneth J. Carstensen

It is certified that error appears in the above-identified patent and that said Letters Patent is hereby corrected as shown below:

In the title, "CASTING" should read --CASING--. Column 1, line 3, after "OR", "CASTINGFig" should read --CASING--
line 55, after "factors" insert a comma --,--
Column 3, line 32, after "amounts" strike the comma (",") and substitute with a period --.--
line 32, before "actual", "under" should read --Under--
line 42, before "flow" insert --low--
line 65, "incorporates" should read --incorporate--
Column 4, line 2, after "reference", "should" should read --shoulder--
Column 8, line 52, after "strings", "an" should read --and--
line 53, before "high" strike "d"
Column 10, line 5, "advantage" should read --advantages--
Column 12, line 3, after "The", "present" should read --preset--
line 19, "simple" should read --simply--
Column 13, line 32, "present" should read --preset--
line 37, after "the", "present" should read --preset--

Signed and Sealed this

Ninth Day of July, 1991

*Attest:*

HARRY F. MANBECK, JR.

*Attesting Officer*         Commissioner of Patents and Trademarks